United States Patent [19] [11] 4,296,065
Ishii et al. [45] Oct. 20, 1981

[54] METHOD OF PRODUCING HIGHLY DENSIFIED CERAMIC ARTICLES

[75] Inventors: Takashi Ishii, Tokyo; Katsutoshi Nishida, Yokohama; Michiyasu Komatsu, Yokohama; Akihiko Tsuge, Yokohama, all of Japan

[73] Assignee: Tokyo Shibaura Electric Co., Ltd., Kawasaki, Japan

[21] Appl. No.: 685,980

[22] Filed: May 13, 1976

[30] Foreign Application Priority Data

May 14, 1975 [JP] Japan ................................. 50-55954

[51] Int. Cl.³ .............................................. C04B 35/58
[52] U.S. Cl. ................................. 264/325; 264/328.2; 264/332
[58] Field of Search .......................... 264/332, 65, 328

[56] References Cited

U.S. PATENT DOCUMENTS

| | | | |
|---|---|---|---|
| 2,990,602 | 7/1961 | Brandmayr et al. | 264/332 |
| 3,409,417 | 11/1968 | Yates | 264/332 |
| 3,455,682 | 7/1969 | Barbaras | 264/332 |
| 3,469,976 | 9/1969 | Iler | 264/332 |
| 3,562,371 | 2/1971 | Bush | 264/332 |
| 3,887,411 | 6/1975 | Goodyear et al. | 264/65 |
| 3,950,464 | 4/1976 | Masoki | 264/332 |
| 3,989,438 | 11/1976 | Smith et al. | 264/332 |
| 4,011,291 | 3/1977 | Curry | 264/328 |
| 4,041,123 | 8/1977 | Lange | 264/332 |

FOREIGN PATENT DOCUMENTS

| | | | |
|---|---|---|---|
| 938776 | 12/1973 | Canada | 264/63 |
| 47-42812 | 12/1972 | Japan . | |
| 1180858 | 2/1970 | United Kingdom . | |
| 1213371 | 11/1970 | United Kingdom . | |

Primary Examiner—John Parrish
Attorney, Agent, or Firm—Oblon, Fisher, Spivak, McClelland & Maier

[57] ABSTRACT

A method of producing ceramic articles having a density substantially equal to the theoretical density comprises heating a highly porous preliminary molding made of a ceramic powder to obtain a preliminarily sintered molding of a porosity below 30%, followed by sintering the preliminarily sintered molding under a uniform pressure by the use of a powder acting as a pressure transmitting medium. This method permits producing a ceramic article having a desired shape, and no deformation in it.

3 Claims, No Drawings

METHOD OF PRODUCING HIGHLY DENSIFIED CERAMIC ARTICLES

This invention relates to a method of producing ceramic articles made of sintered ceramic materials of a high density, and more particularly, to a method of producing substantially nonporous ceramic articles by sintering ceramic materials at a high temperature and under a uniform pressure by the use of a powder acting as a pressure transmitting medium.

It has been of a high concern in the field of this technique to produce a substantially nonporous ceramic article of a desired shape i.e., having a density nearly equal to the theoretical density. Such ceramic articles will find a wide application to those parts of various apparatus which are positioned under high temperatures. Japanese Patent Application disclosed under No. 42812/72 proposes a method aiming at producing such ceramic articles. The method uses a powder acting as a pressure transmitting medium.

Specifically, the first step of the disclosed method is to prepare a preliminary molding from a heat-resistant powdery material, said preliminary molding having micro pores, and being larger than and similar in shape to, the final product aimed at. The preliminary molding is embedded in a certain kind of powder acting as a pressure transmitting medium. The powder used for the purpose is nonreactive and nonfusible at a temperature at which the preliminary molding is allowed to have a density substantially equal to its theoretical density when subjected to a pressure of 1000 to 4000 psi. For convenience, the temperature mentioned is called hereinafter a "densifying temperature". Boron nitride, for example, provides a powder suitable for this purpose.

Pressure is applied in a uniaxial direction to the pressure transmitting powder at a temperature considerably lower than the densifying temperature and, then, the temperature is gradually elevated up to the densifying temperature. Together with the gradual temperature elevation, the pressure is also increased gradually and transmitted isostatically to the preliminary molding so as to sinter the molding. Thus, substantially nonporous and highly densified articles having a complicated shape are obtained. As examples of the preliminary molding, the Japanese Patent Application refers to those made of silicon nitride powder mixed with an additive like powdered magnesia or alumina, said molding having a porosity of 30 to 60%, and to those made of a metal powder and having a porosity of 10 to 25%.

The method described, however, is not satisfactory in that the edge and pointed portions of the preliminary molding are deformed in the sintering step under pressure, rendering the sintered product molding to be inaccurate in shape. The problem is due to the fact that the pressure transmitted through the powder to the edges and pointed portions of the preliminary molding is inevitably lower than the pressure applied to the remaining portions of the preliminary molding.

It is accordingly an object of the invention to provide a method of producing a highly densified ceramic article, which can reduce deformations of the final product unavoidably occurred in a prior art method using a pressure transmitting powder.

According to the present invention, there is provided a method of producing ceramic articles having a density substantially equal to the theoretical density comprising forming a highly porous preliminary molding from a powdered ceramic material, heating the preliminary molding to obtain a preliminarily sintered molding having a porosity below 30%, embedding the preliminarily sintered molding in a pressure transmitting powder, and applying a pressure to the pressure transmitting powder at a sintering temperature so as to compress uniformly the preliminarily sintered molding and remove the pores present in the molding.

The present invention is based on the discovery that a ceramic article can be shaped accurately, however complicated the shape is, to have no deformed edge or pointed portions if a preliminary molding of a high porosity is heated to obtain a preliminarily sintered molding of relatively low porosity and then the preliminarily sintered molding is sintered at a sintering temperature and under a uniform pressure using a pressure transmitting powder.

Indeed, a preliminary baking is sometimes employed in the field of powder metallurgy before a substantial baking. But, the preliminary baking is mainly intended to improve the working condition. It is difficult to handle or work a preliminary molding not subjected to the preliminarily baking. Unlike the preliminary baking, the preliminary sintering involved in this invention is referred to a step of heating a preliminary molding so as to provide a preliminarily sintered molding of a reduced porosity.

Examples of the ceramic materials used in the invention include carbides, oxides, and nitrides of W, Zr, Si, Al, Ti, Ta, Nb, B, V, Hf, Mo and Cr, or mixtures thereof. The mixing of foreign substances into the ceramic material is allowable if the amount is not so much as to impair the effect of this invention. For example, it does not present any inconvenience to add to the ceramic material of silicon nitride less than 30% by weight of yttrium compounds or compounds of lanthanum series elements (La, Ce, Pr, Nd, Pm, Sm, Eu, Gd, Tb, Dy, Ho, Er, Tm, Yd, Lu). It is also acceptable to have the ceramic material mixed with a trace amount of Fe, Ca, Mg or compounds thereof which may be contained in the raw material or present in the process atmosphere.

From powder of the ceramic material is formed a preliminary molding of a high porosity having a desired shape. For this step, it is acceptable to prepare a paste or slurry by adding water or alcohol to the powdered ceramic material and subject the paste or slurry to casting. However, it is preferred to employ a plastic forming, particularly injection forming, which involves adding an organic binder such as polyvinylalcohol or polypropylene. A plastic forming permits producing a preliminary molding with a uniform density and a uniform micro pore distribution. As a result, a more uniform contraction is achieved in the subsequent preliminary sintering step, leading to a product ceramic article with a higher accuracy in shape. Incidentally, a "high porosity" is intended to mean that the porosity is high compared with that of the preliminarily sintered molding. Generally, the porosity of the preliminary molding thus obtained is 30 to 70%, and usually 40 to 50%.

The preliminary molding is subjected to a preliminary sintering under heat so as to reduce the porosity to a value below 30%. A value exceeding 30% fails to produce satisfactory effects in preventing the deformation of the final product. The conditions for this heating step such as temperature, atmosphere, heating time, etc. can be varied depending on a particular ceramic material used. It would not be a matter of difficulty for those skilled in the art to determine these conditions on the basis that the porosity of the preliminarily sintered molding should be below 30%. In general, heating at 1600° to 1900° C. for a desired period of time is satisfactory. Referring to typical examples, a preliminary molding made of silicon nitride is heated under a non-oxidation atmosphere at 1600° to 1850° C. for 10 to 300 minutes. If the preliminary molding is made of silicon carbide, the heating is effected under non-oxidation atmosphere at 1700° to 1900° C. for 10 to 300 minutes. Needless to say, the optimum heating time depends on the size of the preliminary molding. The preliminarily sintered molding thus obtained has in general a porosity ranging from 20% to 29%.

Finally, the preliminarily sintered molding thus obtained is embedded in a pressure transmitting powder, and a predetermined pressure is applied to the powder under a sintering temperature. "Sintering temperature" is intended to mean a temperature at which the preliminarily sintered molding is sintered to have a density substantially equal to the theoretical density when subjected to a predetermined pressure. The applied pressure uniformly transmits to and compress the molding, thus removing the pores present in the molding, while the molding is sintered. Thus, a product ceramic article accurate in shape and having a density substantially equal to the theoretical density and a high mechanical strength is obtained. Specifically, the product ceramic article has a density equal to 95 to 100% of the theoretical density, and usually, exceeding 99% of the theoretical density.

The conditions for the final sintering step also depends on specific ceramic materials used. It would not be difficult for those skilled in the art to determine the optimum conditions. For example, a preliminarily sintered molding of silicon nitride is subjected to a pressure of 250 to 750 kg/cm$^2$ at 1700° to 1850° C. under non-oxidation atmosphere. When it comes to a preliminarily sintered molding of silicon carbide, the final sintering is effected under non-oxidation atmosphere at a pressure of 250 to 700 kg/cm$^2$ and a temperature of 1800° to 2000° C.

The pressure transmitting powder should be nonreactive and nonfusible under the conditions of the final sintering step. The substances suitable for this purpose include, for example, boron nitride (BN), silicon carbide (SiC), carbon (C), aluminum nitride (AlN), and the like. Those skilled in the art would be readily able to select the optimum substance for the specific case.

As described in detail, this invention involves a preliminary sintering step, which permits the product ceramic article to have a density substantially equal to the theoretical density, and to be free from deformation. Clearly, the present method is suitable for producing ceramic articles of complicated shapes. It should also be noted that the ceramic article produced according to this invention has smooth surfaces. This renders the present method particularly suitable for producing articles of complicated shapes such as turbine vanes.

An additional advantage of this invention resides in that the product ceramic article is enabled to bear improved physical or chemical properties including mechanical strength and anti-oxidation property by proper selection of the ceramic material. According to a prior art method, a sintered molding of silicon nitride containing, for example, yttria is produced by a simple step of hot pressing. Hot pressing is certainly effective in producing a highly densified sintered molding, but the sintered molding contains a large portion of noncrystalline phase, leading to a decreased mechanical strength under high temperatures. According to this invention, however, the product ceramic article does not have its mechanical strength decreased under high temperatures. In addition, the article can be enabled to exhibit an improved stability against oxidation. The advantages can be obtained in general when the raw powder being subjected to the present method comprises 0.05 to 30%, preferably 0.1 to 10% by weight of at least one compound selected from the group consisting of oxides of yttrium and lanthanum series elements and compounds convertible to the oxides by heating, and the balance of silicon nitride. Alumina in an amount of 20% by weight or less, preferably 0.5 to 10% by weight may be added to the raw powder mentioned.

More in detail, the advantages noted above are due to the fact that the crystallization of the non crystalline phase in the molding occurs during heating and contracting of the preliminary molding, contributing to the increase of the properties. The crystals grown in the molding is the compound in the form of "silicon nitride-oxides of yttrium and/or lanthanum series element". The crystallization of the non crystalline phase is promoted by the presence of aluminum nitride, which may be allowed to contact the preliminary molding or placed near but apart from the preliminary molding.

This invention will be more fully understood from the following Examples.

EXAMPLE 1

Powders of the ceramic materials indicated in Table 1 below were each molded into a rectangular parallelepiped, 50×50×20 mm, which was heated to obtain corresponding nine pieces of preliminarily sintered molding including controls. These pieces were embedded in boron nitride powder acting as a pressure transmitting medium and sintered under heat and pressure so as to obtain sintered ceramic articles. Table 1 shows the details of the example.

TABLE 1

| Sample No. | Ceramic material (% by wt.) | | Porosity of preliminary molding (%) | Conditions for preliminary sintering | | Porosity of preliminarily sintered molding (%) | Final sintering conditions | | | Porosity of product (%) | Corner deformation of product |
|---|---|---|---|---|---|---|---|---|---|---|---|
| | | | | temp. (°C.) | time (min.) | | temp. (°C.) | press (kg/cm$^2$) | time (min.) | | |
| 1 | Si$_3$N$_4$ | 93 | 40 | 1780 | 150 | 10 | 1800 | 500 | 180 | 0.4 | negligible |
| | Y$_2$O$_3$ | 5 | | | | | | | | | |
| | Al$_2$O$_3$ | 2 | | | | | | | | | |
| 2 | Si$_3$N$_4$ | 93 | 40 | 1750 | 120 | 15 | 1800 | 500 | 180 | 0.5 | negligible |
| | Y$_2$O$_3$ | 5 | | | | | | | | | |
| | Al$_2$O$_3$ | 2 | | | | | | | | | |
| 3 | Si$_3$N$_4$ | 93 | 40 | 1650 | 120 | 25 | 1800 | 500 | 180 | 1 | small |
| | Y$_2$O$_3$ | 5 | | | | | | | | | |
| | Al$_2$O$_3$ | 2 | | | | | | | | | |
| 4 (con- | Si$_3$N$_4$ | 93 | 40 | 1600 | 120 | 30 | 1800 | 600 | 180 | 1 | slightly large |
| | Y$_2$O$_3$ | 5 | | | | | | | | | |

TABLE 1-continued

| Sample No. | Ceramic material (% by wt.) | | Porosity of preliminary molding (%) | Conditions for preliminary sintering | | Porosity of preliminarily sintered molding (%) | Final sintering conditions | | | Porosity of product (%) | Corner deformation of product |
|---|---|---|---|---|---|---|---|---|---|---|---|
| | | | | temp. (°C.) | time (min.) | | temp. (°C.) | press (kg/cm$^2$) | time (min.) | | |
| trol) | Al$_2$O$_3$ | 2 | | | | | | | | | |
| 5 (control) | Si$_3$N$_4$ Y$_2$O$_3$ Al$_2$O$_3$ | 93 5 2 | 40 | 1550 | 120 | 35 | 1800 | 700 | 180 | 1 | large |
| 6 | SiC Al$_2$O$_3$ | 95 5 | 50 | 1850 | 150 | 18 | 1850 | 500 | 150 | 0.5 | negligible |
| 7 | SiC Al$_2$O$_3$ | 95 5 | 50 | 1750 | 150 | 28 | 1900 | 600 | 120 | 1 | small |
| 8 (control) | SiC Al$_2$O$_3$ | 95 5 | 50 | 1650 | 180 | 38 | 1900 | 700 | 150 | 1 | large |
| 9 | Si$_3$N$_4$ MgO | 95 5 | 50 | 1600 | 90 | 16 | 1850 | 500 | 90 | 0.5 | small |

EXAMPLE 2

Mixed powder of silicon nitride with the oxide of yttrium or lanthanum series element was kneaded with the polypropylene plastisizer in an amount corresponding to 26% by weight of the mixed powder. The kneaded mass was molded into a turbine vane by injection molding. The preliminary molding was embedded in aluminum nitride powder filled in a carbon mold and heated at 1650° to 1800° C. for 30 to 150 minutes under nitrogen. The preliminarily sintered molding thus obtained was embedded in boron nitride acting as a pressure transmitting medium and sintered for 150 minutes under a uniform pressure of 600 kg/cm$^2$ and at a temperature of 1700° C. Thus, nine pieces of product turbin vanes were obtained including controls. The details of the example are shown in Table 2 below.

TABLE 2

| Sample No. | Starting materials (% by wt.) | | Porosity of preliminarily sintered molding (%) | Porosity of product vane (%) | Deformation of pointed portions of product vane | Surface roughness of product vane (R max) |
|---|---|---|---|---|---|---|
| 10 | Si$_3$N$_4$ Y$_2$O$_3$ Al$_2$O$_3$ | 93 5 2 | 10 | 0.5 | negligible | 3–5 μ |
| 11 | Si$_3$N$_4$ Y$_2$O$_3$ Al$_2$O$_3$ | 93 5 2 | 20 | 0.5 | negligible | 4–6 μ |
| 12 | Si$_3$N$_4$ Y$_2$O$_3$ Al$_2$O$_3$ | 93 5 2 | 25 | 1 | small | 5–7 μ |
| 13 (Control) | Si$_3$N$_4$ Y$_2$O$_3$ Al$_2$O$_3$ | 93 5 2 | 30 | 1 | slightly large | 9–12 μ |
| 14 (Control) | Si$_3$N$_4$ Y$_2$O$_3$ Al$_2$O$_3$ | 93 5 2 | 35 | 1 | large | 15–20 μ |
| 15 | Si$_3$N$_4$ Ce$_2$O$_3$ | 95 5 | 25 | 1 | small | 7–10 μ |
| 16 | Si$_3$N$_4$ La$_2$O$_3$ | 90 10 | 25 | 1 | small | 7–10 μ |
| 17 | Si$_3$N$_4$ Pr$_2$O$_3$ | 95 5 | 25 | 1 | small | 8–10 μ |
| 18 | Si$_3$N$_4$ Ce$_2$O$_3$ La$_2$O$_3$ | 93 2 5 | 25 | 1 | small | 7–10 μ |
| 19 | Si$_3$N$_4$ Y$_2$O$_3$ | 95 5 | 25 | 1 | small | 5–7 μ |

The flexural strength of any of samples 10 to 12 and 15 to 19 measured at 1200° C. was 90 kg/mm$^2$ or more. These samples were also subjected to anti-oxidation tests by exposing them to the atmosphere at 900° C. for 500 hours and at 1200° C. for 300 hours. The increased amount by oxidation was 0.08 to 0.09 mg/cm$^2$ in the former case and 0.6 to 0.7 mg/cm$^2$ in the latter case, demonstrating a good resistance against oxidation.

Due to the rough surfaces, samples 13 and 14 were low in flexural strength and inferior in antioxidation property. Specifically, the flexural strengths of samples 13 and 14 measured at 1200° C. were 70 kg/mm$^2$ and 50 kg/mm$^2$, respectively. On the other hand, the increased amount by oxidation was 0.8 mg/cm$^2$ or more after these samples were exposed to the atmosphere for 300 hours at 1200° C.

Further, samples 10 to 19 were subjected to X-ray diffraction for the purpose of measuring the degrees of crystallization thereof, with the result that the ratio of Y or any of lanthanum series elements detected by the X-ray diffraction in the form of crystalline phase to the total amount of these elements added to the ceramic material was more than 60% for each sample. This experiment shows that the sintered molding falling within the scope of this invention is superior to that falling outside the scope of this invention in mechanical strength and anti-oxidation property even if crystallization occurres for both cases.

What we claim is:

1. A method of producing ceramic articles of complicated shape having a density substantially equal to the theoretical density, said articles having a surface roughness Rmax of from 3μ to 7μ and substantially no deformed portion, which method comprises:

forming a preliminary molding by injection molding a powdered ceramic material selected from the group consisting of carbides, oxides and nitrides of W, Zr, Si, Al, Ta, Nb, B, V, Hf, Mo, Cr and mixtures thereof, said preliminary molding having a porosity of 30 to 70% with a uniform pore distrubition;

heating said preliminary molding at a temperature of from 1550° C. to 1900° C. to obtain a preliminarily sintered molding of a porosity below 30 percent;

embedding said preliminarily sintered molding in a pressure transmitting powder which is nonreactive and nonfusible under the conditions of the subsequent sintering; and applying pressure to the pressure transmitting powder at a sintering temperature so as to compress uniformly the preliminarily sintered molding and remove the pores present in the molding.

2. A method according to claim 1, wherein the preliminary molding has a porosity of 40 to 50%.

3. A method according to claim 2, wherein the ceramic material which mainly comprises silicon nitride, and boron nitride is used as the pressure transmitting powder.

* * * * *